United States Patent [19]

Danielsen

[11] Patent Number: 5,073,890
[45] Date of Patent: Dec. 17, 1991

[54] REMOTE AGENT OPERATION FOR AUTOMATIC CALL DISTRIBUTORS

[75] Inventor: Peter J. Danielsen, Wheaton, Ill.

[73] Assignee: AT&T Bell Laboratories, Murray Hill, N.J.

[21] Appl. No.: 292,190

[22] Filed: Dec. 30, 1988

[51] Int. Cl.⁵ .......................... H04J 3/08; H04M 3/60
[52] U.S. Cl. ................................ 370/58.2; 370/110.1; 379/265; 379/309
[58] Field of Search ....................... 370/58.1, 77, 85.1, 370/110.1, 94.1, 60, 58.2, 62; 379/34, 94, 96, 265, 266, 309, 207

[56] References Cited

U.S. PATENT DOCUMENTS 4,656,623  4/1987  Dalby, Jr. et al. ............. 370/60
4,694,483  9/1987  Cheung ........................ 379/34
4,893,301  1/1990  Andrews et al. ............. 370/58.2

OTHER PUBLICATIONS

"AT&T's Operator Services Position System (OSPS): Opportunities in Enhancing Operator Services", P. Laurin, G. J. Valentine, *Proceeding of International Telecommunication Symposium*, Sep. 23-25, 1987, Taipei, Taiwan, R.O.C., pp. 69-81.
*OSPS Information Guide*, Oct., 1987, Issue 1, pp. 5 through 19.

*Primary Examiner*—Douglas W. Olms
*Assistant Examiner*—Min Jung
*Attorney, Agent, or Firm*—Werner Ulrich

[57] ABSTRACT

This invention relates to an automatic call distributor (ACD) arrangement for economically providing ACD service from remote ACD agents. A remote ACD agent position is located near a local switching system which connects to an ACD host switch via a telecommunication network comprising a common channel signaling facility. The remote ACD agent position and an ACD process at the host switch communicate with each other by sending data messages via the common channel signaling facility and the local switching system. A front-end process at the host switch acts as a data message interface between the remote ACD agent position and the ACD process by performing protocol conversion between the common channel signalling facility message format and the ACD process message format. The front-end process also establishes a voice connection between the host switch and the remote ACD agent position. The ACD process connects incoming customer to the remote ACD agent position for servicing of the call by the remote ACD agent. Advantageously, this arrangement permits the complex ACD software to treat remote and local agent positions alike and uses an economic communication arrangement for connecting the remote agent position to the host switch.

25 Claims, 3 Drawing Sheets

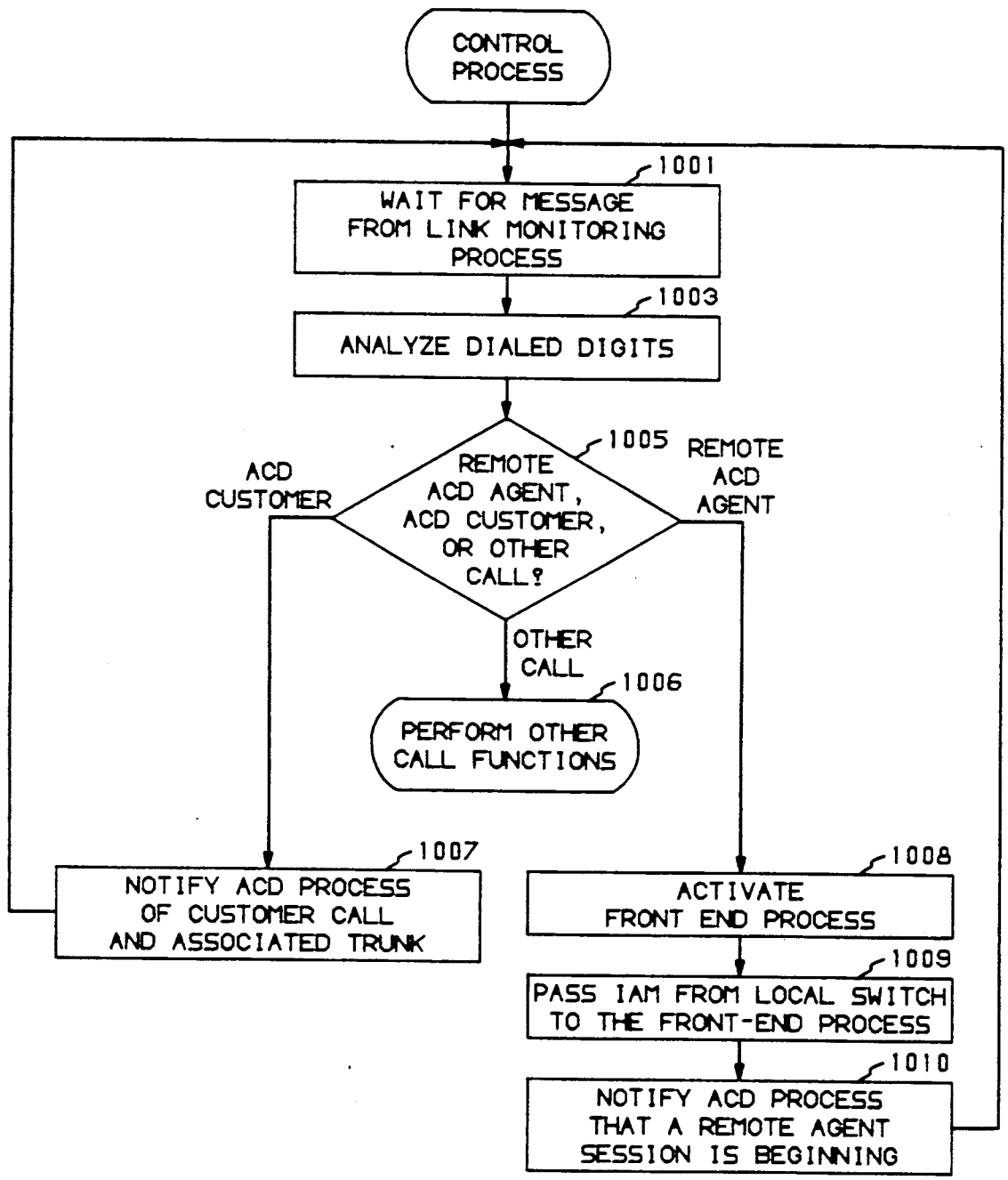

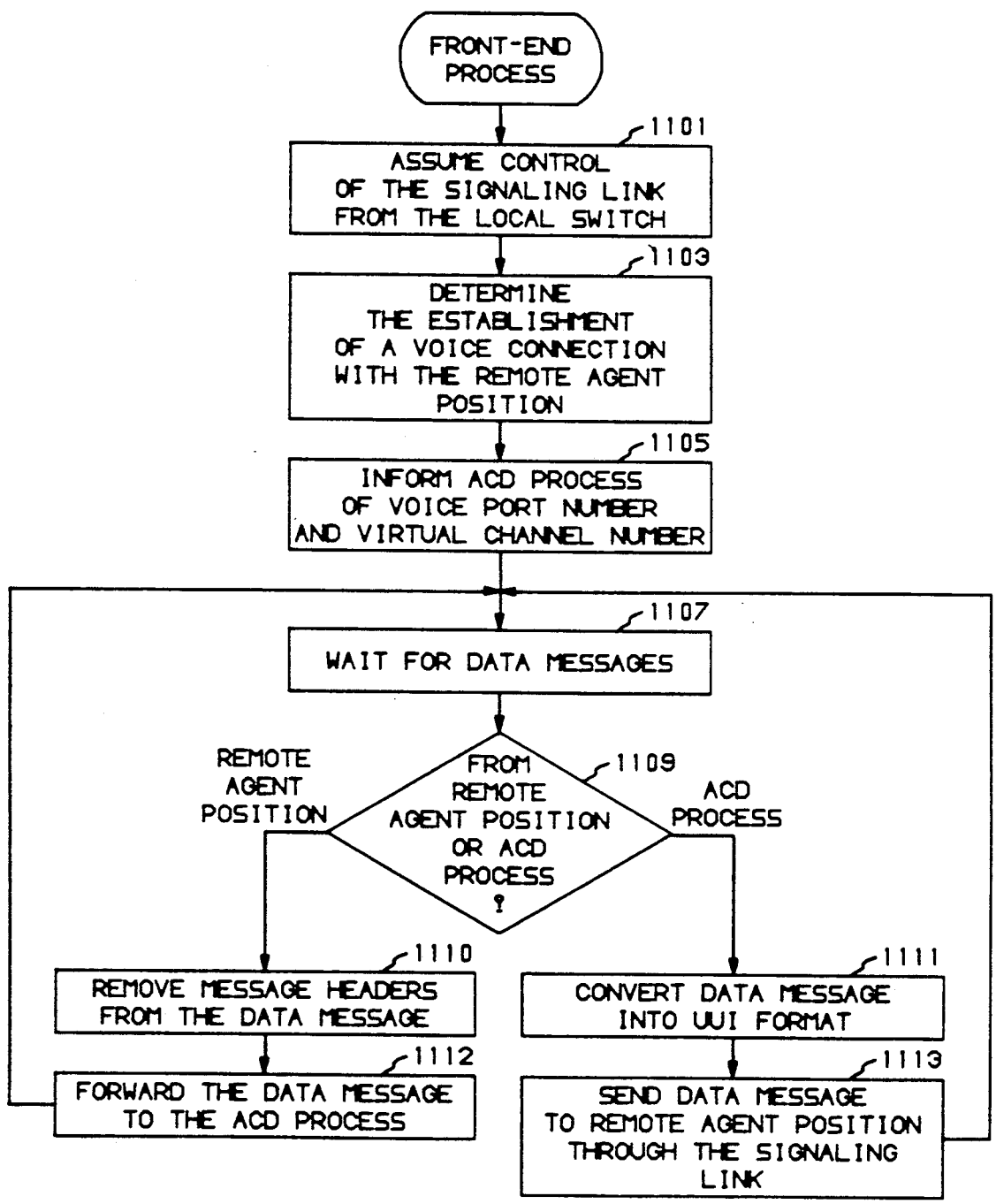

REMOTE AGENT OPERATION FOR AUTOMATIC CALL DISTRIBUTORS

TECHNICAL FIELD

This invention relates to arrangements for serving calls to an automatic call distributor by remotely located agents.

PROBLEM

Agents or operators are used by many businesses to service customers by phone. These agents or operators, hereinafter referred to as agents, often use terminal equipment called an agent position. Businesses often employ several agent positions associated in a group to handle multiple calls simultaneously. Modern telecommunication switching systems facilitate access to these agents by providing automatic call distribution (ACD) systems that allow incoming customer calls to be routed to individual agent positions as they become available.

Modern telecommunication systems provide a means for agents to perform two main functions. First, the agents exchange information with a customer by voice communication. Therefore, switching systems provide voice connections between incoming ports connected to customer stations and ports connected to selected agent positions from the group of agent positions of the automatic call distribution system. Secondly, agents enter requests into terminals at the agent positions to access data bases for information to be used in handling customer calls. Thus, a data connection from the agent positions to the data bases must also be provided.

In the prior art, some systems have used separate paths for data sent between the agent position and a data base, and for the voice connection between the agent position and an incoming port of a switching system. The use of a separate data path makes it costly to locate agents remotely from the data base with which they communicate, and also makes it costly and inconvenient for agents to communicate with several databases.

More recent prior art systems have used a communication facility carrying integrated voice and data signals to the switching network on one path, such as that used for the integrated services digital network (ISDN). A basic rate interface (BRI) ISDN path comprises a connection from a customer premises terminal, such as an agent position, to a telecommunications switching system; the path carries a 144 kb signal which comprises two 64 kb B-channels, each for carrying one voice or high speed data signal, and one 16 kb D-channel for carrying communications control signals and lower speed data signals. To use a simple and inexpensive two-wire path for carrying this signal from an agent position to a switching system, the agent position must be located within a few miles of the host telecommunications switching system (host switch) which controls the ACD or provides the ACD service. This limitation of a few miles does not allow agent positions to be located remotely from the switching system.

In one arrangement of the prior art, a group of agent positions remotely located from the host switch can use a dedicated digital carrier to send voice and data signals to the host switch along an integrated signal path. However, such a carrier is expensive, and agent positions within a group cannot be located remotely from each other because the agent positions must be located within a few miles of the dedicated digital carrier if large additional expenses for connections between the carrier and the agent positions are to be avoided.

A recognized problem in the art, therefore, is that systems for providing agent services, using a communication facility supporting integrated voice and data signals do not allow for the economical placement of agent positions at locations remote from host switch or from other agent positions of an ACD.

SOLUTION

The aforementioned problem is solved and a technical advance is made in the art by providing an arrangement for connecting a remote agent position to a nearby local telecommunications switching system (local switch), and which is connected by voice and data connections to a host telecommunications switching system for the associated ACD. Illustratively, an agent position is connected to the local switch via a direct line, such as two-wire line, that supports integrated voice and data signals. The local switch is connected to the host switch by a telecommunication network that supports integrated voice and data signals. Advantageously, agent positions can be economically located far from the host switch without dedicated digital carriers, and agent positions can be economically located far from other agent positions within the same group.

In one specific embodiment of the invention, an integrated services digital network (ISDN) is used as a communication facility to connect an agent position to a local switch. The agent position comprises a terminal having a CCITT (International Consultative Committee for Telephone and Telegraph) standard Q.931 ISDN interface. Advantageously, the agent position can send voice and data signals to a local office on one integrated line.

In accordance with one aspect of the specific embodiment, the local switch sends voice signals to the host switch via a voice trunk and uses a CCITT standard Signaling System 7 (SS7) data connection to send data to the host switch. SS7 supports out of band signaling to send packet data from the local office to the host switch. Advantageously, because generalized data packets, containing incoming agent numbers, can be sent to the host switch, incoming agent numbers can be identified by the host switch. Advantageously, a direct line from the agent positions to the host switch is not required, and dedicated digital carriers are not required to send packet signals from the agent positions to the host switch.

In accordance with one aspect of the invention, a software front-end process in the host switch receives data packets from agent positions currently communicating by voice over a trunk connected to the host switch. This front-end process interprets the contents of these data packets and sends the appropriate messages to an ACD control process which then performs any required tasks, such as setting up a voice connection between an agent position and a customer; and performs a similar function of interpreting packets in the reverse direction, that is, from the ACD control process to the remote agent position. Advantageously, a remotely located agent position can be connected from a nearby local switch to the host switch over an interoffice voice trunk, and can transmit and receive data packets over a SS7 data connection, with the front-end process acting as a software interface between the protocols of the ACD process and the interoffice signaling protocol.

In accordance with another aspect of this invention, the software front-end process acts as a data message sending, handshaking interface between the ACD process in the host switch and the local switch connected to the remote agent position. The ACD process generates and sends messages as if it were serving a local agent. Advantageously, the ACD process does not have to be altered to serve a remote agent; the "remoteness" of the remote agent position is transparent to the ACD process of the host switch.

In accordance with the preferred embodiment of this invention, a remote agent dials a specific number identifying an ACD agent servicer. This number is sent over a communications facility supporting integrated voice and data signals to a local switch. The local switch sends the number to a host switch over a telecommunications network which supports both voice and data signals. The host switch interprets the number to be from a remote agent position and activates a software front-end process. The activation of this process begins an agent session. From the beginning of the session until the agent terminates the session, the front-end process performs protocol conversion on and transfers ACD communication data packets between the agent position and the host ACD process. The host switch ACD thereby allows customer calls to be routed over an interoffice trunk to the remote agent position when it is available to receive calls, and interprets and performs other tasks requested by the agent position. Advantageously, agent positions using a communications system supporting integrated voice and data signals can be economically located far from a host switch and from other agent positions within the same group.

Accordingly, this invention relates to an arrangement wherein an automatic call distributor (ACD) is controlled by an ACD process at the host switch, and an agent position of the ACD that is served by a local switch. A voice and data connection is set up between the host switch and the remote agent position. The ACD process determines the establishment of a voice connection between the remote agent position and any customer calls to be serviced by the remote agent position. Advantageously, ACD customers can be serviced by remote ACD agents at a low cost and with a minimum of change in the ACD control software.

BRIEF DESCRIPTION OF THE DRAWING

The invention will be better understood from the following detailed description when read with reference to the following drawing in which:

FIGS. 2 and 3 are program flow diagrams illustrating the handling of various signals and messages passed between an ACD and a telecommunications network.

DETAILED DESCRIPTION

Figure 1:
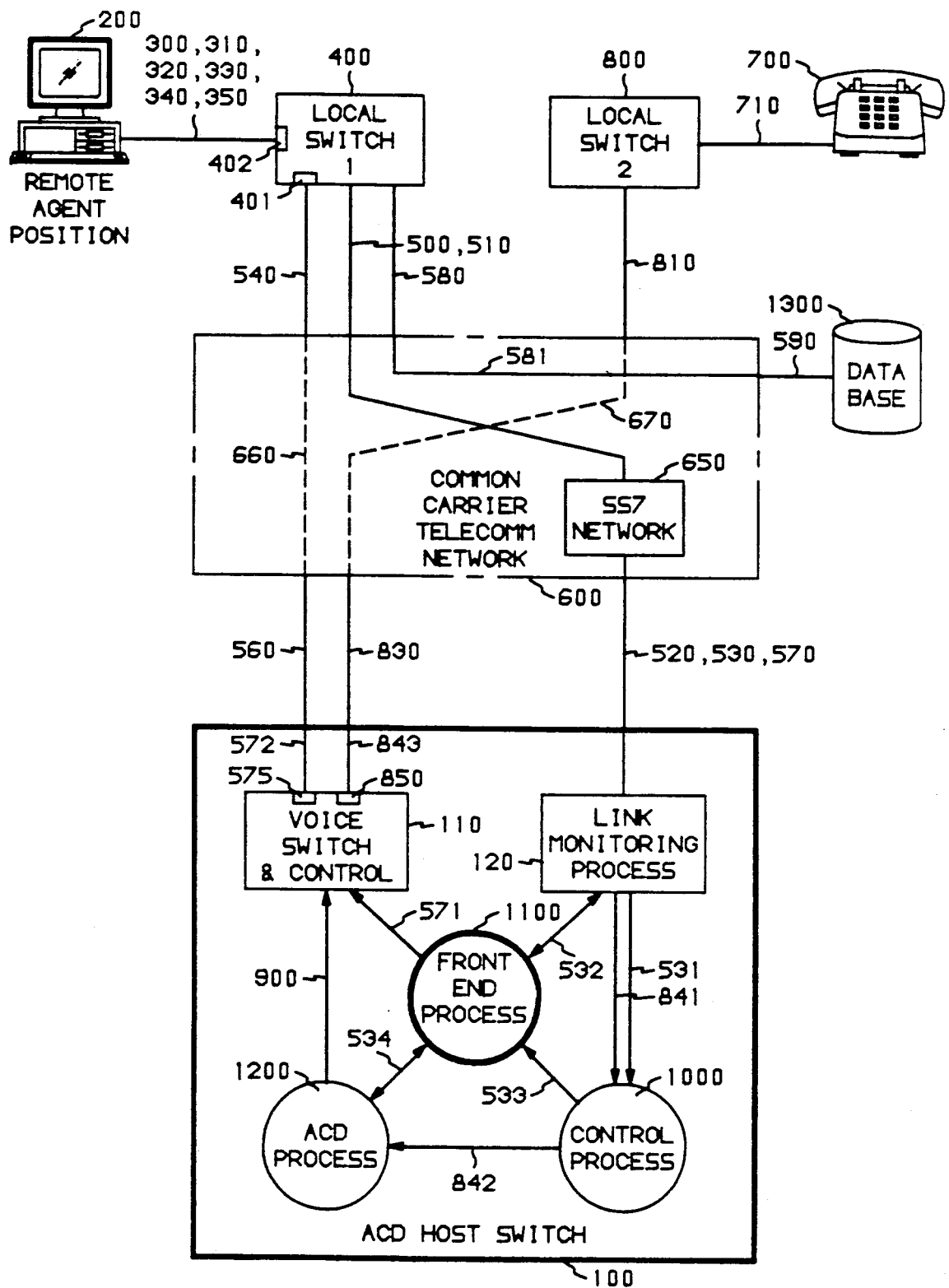
FIG. 1 is a block diagram of an arrangement illustrating the connection of a remote agent position to an ACD host switch (heavy line blocked), comprising a front-end process (heavy line blocked); to a customer phone; and to a remote data base.

Automatic call distributors (ACD) and their associated agent positions are used by the employees of businesses such a travel agencies, department stores, and airlines to provide service to customers. An ACD system is used by a group of agent positions to route customer calls to an available agent position, and also to perform various tasks requested by an agent position, such as accessing a data base. FIG. 1 is a block diagram illustrating an exemplary embodiment of the invention and shows a connection of a remote agent position 200 with a customer telephone 700 and a remote data base 1300.

A remote agent session begins with a remote ACD agent login call, which starts at a remote agent position 200 when an agent dials a number, identifying the ACD and identifying the call as an ACD servicer call (in contrast to an ACD customer call). The number is sent on a direct physical line 300, from the remote agent position 200 to a local switch 400, using a communications facility supporting integrated voice and data signals. In the exemplary embodiment, the communications facility used is a basic rate interface (BRI) of an integrated services digital network (ISDN); the direct physical line 300 is a two-wire line comprising a data facility 310 and a voice facility 320.

The remote agent position 200 sends the dialed number over data facility 310 using a virtual link 330. The dialed number data is transmitted over the virtual link 330 from a terminal 200 having a International Consultative Committee for Telephone and Telegraph (CCITT) standard Q.931 interface, as described in CCITT Red Book Fascicle VI.9 Recommendation Q.931. The Q.931 protocol allows data to be sent as part of a SETUP message for call set-up and as part of user information (USER INFO) messages for other types of data. These message types are defined by the Q.931 protocol. Local switch 400 supports ISDN and communicates with the remote agent position using the Q.931 ISDN protocol.

The local switch 400 uses the dialed number contained in the SETUP message to identify a host switch 100 for an associated ACD to which the remote agent position 200 is to be connected. The local switch 400 uses a telecommunications network 600 supporting integrated voice and data signals to send the digits dialed by the remote agent position 200 to the host switch 100. The telecommunications network 600 comprises a common channel signaling network, herein a CCITT standard Signaling System 7 (SS7) network 650, for transmitting data packets between switches connected by the network 600. In the exemplary embodiment, a SS7 data connection in network 650 is used for the transmission of data between the local switch 400 and the host switch 100. The data is contained in initial address messages (IAM) for call set-up and in user to user information (UUI) for other messages transmitted through the network 650. An IAM containing the digits dialed from the remote agent position 200 is sent through a physical signaling link 500, over an associated virtual link 510, to the SS7 network 650, which then sends the IAM to the host switch 100 on physical link 520, over an associated virtual link 530.

A voice path from the remote agent position 200 to the host switch 100 is established simultaneously with the data path for transmitting the IAM. This voice path is established in the same way as prior art voice paths for other customer calls, using well-known voice call establishment procedures. The voice path comprises: a connection from the remote agent position 200 to the local switch 400 over the voice facility 320 of direct line 300 terminating on port 402 of the local switch 400; a connection in local switch 400 between ports 402 and 401; a connection from port 401 on the local switch 400 over voice trunk 540 to the telecommunications network 600; a path 660 through the telecommunications network 600 to a voice trunk 560, which connects to the host switch 100; and a voice path 572 from the voice trunk 560 to a port 575 on a voice switch and control 110.

The IAM containing the digits dialed by the remote agent is received at the host switch 100 by a link monitoring process 120, which activates a control process 1000 and forwards the message to the control process 1000 over a message link 531. The control process handles data sent and received through a data link for normal calls. In the exemplary embodiment, the control process 1000 removes the IAM message headers and analyzes the dialed digits. Once it recognizes that the dialed number is for an ACD agent login call, it activates a front-end process 1100, and passes any necessary data, such as the dialed number, to the front end process 1100, over a message link 533. The front-end process 1100 then is connected to the virtual signaling link 530, connected to the remote agent position 200, via a message link 532 to the link monitoring process 120. Consequently, subsequent messages from the remote agent position 200 are routed to the front-end process 1100.

Once the front-end process 1100 is activated, it handles all data sent and received through the message link 532. The handling of data comprises converting messages received from the message link 532 from SS7 message format to an internal message format for the ACD; sending the converted messages to the ACD process over message link 534; converting messages received from the ACD process over message link 534 to SS7 message format; and sending the SS7 formatted messages over message link 532 to virtual link 530, via the link monitoring process 120. The local switch 400 performs the conversion of data from SS7 message format to Q.931 message format as part of its normal work in processing data messages between ISDN stations and the SS7 network 650.

The front-end process 1100 also determines that a voice connection has been established between the remote agent position 200 and a port 575 on the voice switch and control 110. The front-end process further determines that this voice connection is to be associated with a data channel comprising virtual signaling links 510 and 530. For clarity, different links of virtual channel are given different numbers, even though the different links are part of the same virtual connection. For example, the virtual channel between the remote agent position 200 and the front-end process 1100 includes virtual links 330, 510, 530 and message link 532. As used herein, a virtual channel or a virtual connection may include protocol conversions, for example, from Q.931 to SS7.

The front-end process 1100 passes the dialed number of the remote ACD agent login call to the ACD process 1200, over message link 534. The ACD process 1200 then begins a login procedure for the remote agent. This login procedure is identical to the procedure used by a local agent directly connected to the host switch 100. An individual calling line identification (ICLID), which identifies the calling agent, is provided by the IAM from the calling agent. The ACD process 1200 maps this ICLID to an agent position number. It sends a login request message to the front-end process 1100, over a message link 534, which converts the request message into the UUI message format, and sends the converted request message through the message link 532 over the virtual link 530 to the SS7 network 650 and to the local switch 400 on the virtual link 510.

The local switch 400 then converts the received request message into Q.931 format and transmits the request message in that format to the remote agent position 200 on the virtual link 330 of data facility 310. After receiving the login request message, the agent enters the login identification and password associated with the agent position number into a terminal of the agent position. The agent position 200 sends the login identification and password to the local switch 400 as a USER INFO message, which is converted in the local switch 400 to a UUI message in accordance with the standard procedure for all user messages sent over the SS7 network. The local switch 400 routes a UUI message containing the login identification and password to the host switch 100, where it is received by the link monitoring process 120 and forwarded to the front-end process 1100 over message link 532. The format of IAM and UUI messages is well known and defined in CCITT Red Book, Volume VIII, Fascicle VIII.4, Recommendation X.61.

The front-end process 1100 removes the UUI message headers and sends the login identification and password to the ACD process 1200 in this simplified internal protocol, which verifies the login identification and password. If the login identification and password matches that maintained in the host switch, then the login identification is valid, and a remote agent session is established. The ACD process 1200 sends an appropriate message to the remote agent position 200, alerting it that a session has been established. The remote agent position 200 can now service customers. The establishment of the voice connection between the remote agent position 200 and the host switch 100 is done concurrently with the login procedure for the remote agent in the exemplary embodiment. This invention is not limited to any specific order of these events.

In the exemplary embodiment, one instance of a front-end process and an ACD process exists for each remote agent, and one instance of a control process exists for each remote agent and each customer connected to the ACD. For clarity, only one instance of each type of process is referred to in the description and drawing.

Suppose that a customer calls the ACD which now includes the agent position 200. Suppose that the call is made from a customer phone 700 and the call is carried to a local switch 800 on a physical voice link 710. The voice connection for the call is routed from the local switch 800 via a voice trunk 810, through the telecommunications network 600 to the host switch 100 on physical voice trunk 830 connected to port 850 on voice switch and control 110. The voice connection is established using well known prior art voice connection establishment procedures. Data for the call is received in the host switch 100 over a virtual link 570 by the link monitoring 120 which sends the data over message link 841 to the control process 1000. The control process 1000 analyzes the dialed digits and determines the call to be a customer call to the ACD. The control process 1000 notifies the ACD process 1200 of the customer call via a message link 842, and sends all pertinent information regarding the call to the ACD process 1200.

Once the ACD process 1200 receives this information from the control process 1000, if agent position 200 is available to service the customer call, the ACD process requests voice switch and control 110, over a connection indicated by the message link 900, to establish a voice connection between port 575, connected to the voice path 572 from the remote agent position 200, and port 850, connected to a voice path 843 to voice trunk 830 that is connected to the customer phone 700. Thus, a voice connection is established between the customer phone 700 and the remote agent position 200, and the remote ACD agent can talk to the customer.

Frequently, ACD agents access data bases to obtain information necessary for serving customers. Assume that the access requires a B-channel. Herein, such data base accesses are not processed by the ACD process, but are handled directly by other processes of the switch to which an agent is connected.

Data base access for the remote agent is accomplished in the exemplary embodiment in the following manner. The remote agent signals from the remote agent position 200 a request including a number for identifying a data base 1300 to the local switch 400 on virtual link 330. The local switch 400 then directs the call to the telecommunications network 600 on channel 580; the telecommunications network establishes a connection over channel 590 with the data base 1300. A connection is established between the data base 1300 and the remote agent position 200 over the second B-channel (i.e., the B-channel not used for the voice connection) 340 of communication facility 300, through the local switch 400 and the telecommunications network 600, and the remote agent position 200 can now access the data base 1300. This invention is not limited to this implementation, however. Alternatively, the ACD process 1200 could handle the establishment of a connection with a data base and data base accesses, instead of the remote agent position 200.

FIG. 2 is a program flow diagram of a control process, such as control process 1000 in FIG. 1. Such a process is activated whenever a call is received. It waits for a message from the link monitoring process 120 in FIG. 1 as shown in action box 1001. The control process 1000 analyzes the dialed digits received from the incoming remote agent call and contained in the message sent by the link monitoring process 120 over message link 531 in FIG. 1 (action box 1003). It makes a decision based on that analysis (action box 1005). If the analysis reveals that the call is a remote ACD agent login call, the control process performs the following steps: first, it activates a front-end process (action box 1008) that will assume control of the message link with the link monitoring process 120; second, the control process passes the IAM sent from the remote agent's local switch to the front end process (action box 1009). Thereafter, the front-end process receives all data sent from the remote agent position 200 (FIG. 1) via message link 532; finally, the control process notifies the ACD process that a remote agent session is beginning (action block 1010).

If the analysis of action block 1003 reveals that the call is from a voice trunk, and the dialed digits are associated with the ACD, then the call is an ACD customer call. The control process notifies the ACD process of the ACD customer call and the trunk associated with the call (action box 1007). The control process returns to waiting for messages from the link monitoring process 120.

If the analysis reveals that the call is neither a remote ACD agent login call nor an ACD customer call, then the control process 1000 performs the necessary functions for other calls (action box 1006).

FIG. 3 is a program flow diagram of the front-end process 1100 which serves as an interface and communication link between the remote agent's local switch and the host switch ACD. It performs protocol conversions between SS7 message format and the ACD internal message format. Alternatively, the protocol conversion could be performed by an appropriate protocol converter unit. After the front-end process is activated by the control process in response to a remote ACD agent login call, and receives the IAM from the remote agent's local switch, the front-end process assumes control of the signaling link from the local switch. It assumes control of the signaling link from the local switch (action box 1101) and establishes a message link, such as message link 532 in FIG. 1, with the link monitoring process 120 which receives data arriving at the host switch from the signaling link, such as signaling link 530 in FIG. 1. Responsive to the establishment a voice connection between the host switch and the remote agent position, the front-end process associates a port (port 575 here) on the voice switch and control 110 (FIG. 1) connected to the remote agent position, with the virtual channel established for that remote agent position. Such a voice connection is shown in FIG. 1 by the path from port 575 in the voice switch and control 110, and going through the voice paths 572, 560, 660, 540, and 320 to the remote agent position 200 in FIG. 1. When the front-end process determines that the voice connection has been established (action box 1105), it informs the ACD process of the voice port number 575 and the virtual link number (530) associated with the remote agent position (action box 1105). The ACD process adds the agent position to the list of active ACD agents after the login procedure is complete. The front-end process waits for data messages to arrive (action box 1107).

When a data message is sent to the front-end process, it determines whether the data message is from the remote agent position or from the ACD process (test 1109). If the front-end process determines that the data message is from the remote agent position, then the message is either in the form of a IAM or a UUI message from the remote agent's local switch. The front-end process removes the message headers from the data message (action box 1110) and forwards the data message to the ACD process action box 1112.

If the front-end process determines that the message has been sent from the ACD process (test 1109), then it converts the data message to the UUI message format (action box 1111) and sends the message (action box 1113) in UUI format to the local switch of the remote agent to whom the data message is to be sent, via a signaling link associated with that remote agent's call.

A remote ACD agent session is terminated by a remote ACD agent logoff message sent from a terminating remote agent position to the host switch ACD process or by an abrupt disconnection of the remote agent position's voice connection caused, for example, by the remote agent disconnecting. When the logoff message arrives at the host switch, it is received by the link monitoring process 120 in the host switch, which forwards the logoff message to the front-end process 1100. The front-end process recognizes the logoff message and prepares to disconnect the voice connection established for the remote agent position. The front-end process forwards the logoff message to the ACD process, which disconnects any customer voice connections established with the terminating remote agent position, removes the terminating agent position from the active ACD agent list, and sends a message back to the front-end process for the terminating remote agent position indicating that the logoff is complete. When the front-end process receives the termination acknowledgement message from the ACD process, it determines that the voice connection established for the terminating remote agent position is to be disconnected, and sends the terminating acknowledgement message to the terminating remote agent position. The telecommunications network and the remote agent position handle the disconnection of any data connections associated with the terminating remote agent position after logoff is complete.

It is to be understood that the above-described procedures are merely illustrative of the principles of the present invention and many variations may be devised by those skilled in the art without departing from the spirit and scope of the invention.

I claim:

1. An automatic call distributor (ACD) switching network service method of serving calls from a position of the ACD, the ACD controlled by an ACD process means of a first common carrier switching system, wherein the position is served by a second common carrier switching system, comprising the steps of:

establishing a switched voice and a data connection via the second switching system between the position and the first switching system;

under the control of the ACD process means, connecting incoming calls, from any switching system, to the voice connection between the first switching system and the position, for service by the position, and the position communicating with the ACD process means via the data connection in serving each call.

2. In a first common carrier switching system, an automatic call distributor (ACD) arrangement comprising:

an ACD process means responsive to an incoming call to an ACD for assigning an agent position for serving the call, and for communicating with the agent position using data messages in a first protocol, said first protocol for communicating with agent positions served by said first common carrier switching system; and means for converting data messages between the first protocol and a second protocol for communicating via the second protocol over a telecommunications network for communicating with an agent position attached to a second common carrier switching system, said second protocol for transmitting messages between said first and said second switching systems.

3. An automatic call distributor (ACD) switching network service method of serving calls from a position of the ACD, the ACD served by a first common carrier switching system and controlled by an ACD process means of the first system, wherein the position is served by a second common carrier switching system, comprising the steps of:

establishing a switched voice and a data connection via the second common carrier switching system between the position and the first common carrier switching system, wherein said establishing comprises:

establishing a first data connection between the position and a front-end process means of the first system for interfacing between the ACD process means and the position, and establishing a message link between the front-end process and the ACD process means;

under the control of the ACD process means, connecting incoming calls, from any switching system, to the voice connection between the first switching system and the position, for service by the position, and the position communicating with the ACD process means via the data connection in serving each call;

sending messages in a first protocol from the ACD process means to the front-end process via the message link for conversion to a second protocol for sending messages to the position via the first data connection; and sending messages in the second protocol from the position to the front-end process means via the first data connection for conversion to the first protocol for sending messages to the ACD process means via the message link.

4. The method of claim 3 wherein the first system comprises a control process means and wherein the establishing comprises:

responsive to a receipt by the control process means of an initial message from the position, enabling the front-end process means;

passing an initial message from the position to the front-end process means to control the ACD process means for making the position available to serve calls.

5. The method of claim 4 wherein the voice connection terminates on a first communication port of the first system, further comprising:

responsive to the enabling of the front-end process means and to establishing the voice connection, associating the data connection with the first communication port.

6. The method of claim 5 further comprising:

setting up a message link between the front-end process means and the ACD process means; and notifying the ACD process means of the association of the first communication port and the message link.

7. The method of claim 3 wherein establishing of the data connection comprises:

establishing a virtual data circuit interconnecting the first system, the second system, and the position.

8. The method of claim 7 wherein establishing the virtual data circuit comprises:

establishing a virtual data channel between the first switching system and the second switching system over a telecommunications network for transmitting voice and data signals and for interconnecting the first system and the second system.

9. The method of claim 8 wherein establishing the virtual data channel comprises:

establishing a virtual data channel between the first system and the second system over a common channel signaling network.

10. The method of claim 4 further comprising:

sending data messages in the first protocol between the position and the second system; and sending data messages in the second protocol between the first and second systems.

11. The method of claim 4 wherein the first system further comprises a monitoring process means, and wherein the establishing of the data connection further comprises:

responsive to an initial message from the second system to the monitoring process means, enabling the control process;

establishing a message link between the monitoring process means and the control process means; and responsive to the passing of the initial message from the control process means to the front-end process means, establishing a direct message link from the monitoring process means to the front-end process means.

12. The method of claim 4 further comprising:

receiving a call to the ACD on a second port of the first system;

responsive to the reception of the call, the ACD process means selecting the position for serving the calls; and responsive to the selection of the position, setting up a connection between the first and second ports.

13. The method of claim 3 further comprising:

sending a login request message from the ACD process means to the position via the front-end process means, the monitoring process means, and the second system;

receiving a login message from the position to the ACD process means;

verifying the login for the position by the ACD process means;

responsive to the verifying step, adding the remote agent position to a list of active positions maintained by the ACD process means.

14. An automatic call distributor (ACD) switching network service method of serving calls from a position of the ACD, the ACD served by a first common carrier switching system and controlled by an ACD process means of the first system, wherein the position is served by a second common carrier switching system, comprising the steps of:

establishing a switched voice and a data connection via the second common carrier switching system between the position and the first common carrier switching system;

under the control of the ACD process means, connecting incoming calls, from any switching system, to the voice connection between the first switching system and the position, for service by the position, and the position communicating with the ACD process means via the data connection in serving each call;

and prior to the establishing of the switched voice and data connections, transmitting a request, comprising a telephone number identifying the ACD and identifying the call to the first system as a request to set up an agent session from the position to the first system, from the position to the second system for initiating the establishing of the voice and data connections.

15. The method of claim 14 wherein establishing voice and data connections comprise:

establishing a voice connection and a data connection between the position and the second system over an integrated voice and data facility.

16. The method of claim 15 wherein establishing voice and data connections comprises:

establishing a voice connection and a data connection between the position and the second system over an integrated voice and data facility that carries signals conforming to an integrated services digital network signal arrangement.

17. An automatic call distributor (ACD) switching network service method of serving calls from a position of the ACD, the ACD served by a first common carrier switching system and controlled by an ACD process means of a first common carrier switching system, wherein the position is served by a second common carrier switching system, comprising the steps of:

establishing a switched voice and a data connection via the second switching system between the position and the first switching system;

under the control of the ACD process means, connecting incoming calls, from any switching system, to the voice connection between the first switching system and the position, for service by the position, and the position communicating with the ACD process means via the data connection in serving each call; and responsive to a request from the position for accessing a data base, the second system establishing a data connection between the position and the data base.

18. The method of claim 17 wherein the position is connected to the second system by an integrated voice and data facility comprising a D-channel and two B-channels, wherein setting up the data connection between the position and the data base comprises:

setting up a connection between the second system and the position over one of the B-channels.

19. An automatic call distributor (ACD) arrangement comprising:

ACD process means responsive to an incoming call to an ACD for assigning an agent position for serving the call, and for communicating with the agent position using data messages in a first data transmission protocol, said first protocol for communicating with agent positions served from a first switching system comprising said ACD process means; and means for converting data messages between the first protocol and a second data transmission protocol for communicating via the second protocol with an agent position, said second protocol for transmitting messages between said first switching system and a second switching system.

20. An automatic call distributor (ACD) arrangement comprising:

ACD process means responsive to an incoming call to an ACD for assigning an agent position for serving the call, and for communicating with the agent position using data messages in a first protocol, said first protocol for communicating with agent positions served from a first switching system comprising said ACD process means; and means for converting data messages between the first protocol and a second protocol for communicating via the second protocol with an agent position, wherein the means for converting comprises a front-end process means and wherein the ACD process means and the front-end process means reside in a processor means of a common carrier switching system, said second protocol for transmitting messages between said first switching system and a second switching system.

21. In a common carrier switching system, an automatic call distributor (ACD) arrangement comprising:

ACD process means responsive to an incoming call to an ACD for assigning an agent position for serving the call, and for communicating with the agent position using data messages in a first protocol, said first protocol for communicating with agent positions served from a first switching system comprising said ACD process means; and means for converting data messages between the first protocol and a second protocol for communicating via the second protocol with an agent position, said second protocol for transmitting messages between said first switching system and a second switching system and wherein the common carrier switching system further comprises:

a switching network having a plurality of ports and a data link for connection to a common carrier network for establishing voice connections to an originator of the call and to the agent position, and for transmitting data messages between the agent position and a front-end process means of said switching system.

22. The arrangement of claim 21 wherein said call of said originator is connected to a first port of said network and a voice connection to said position is connected to a second port of said network further comprising:

means, responsive to receipt of said call for the ACD for notifying the ACD process means of said call; and the ACD process means responsive to said notification for establishing a connection between said first and said second port.

23. An automatic call distributor (ACD) arrangement comprising:

ACD process means responsive to an incoming call to an ACD for assigning an agent position for serving the call, and for communicating with the agent position using data messages in a first protocol, said first protocol for communicating with agent positions served from a first switching system comprising said ACD process means; and means for converting data messages between the first protocol and a second protocol for communicating via the second protocol with an agent position, and wherein said means for converting comprises a front-end process means for communicating messages in the first protocol over a message link to the ACD process means and for communicating messages in the second protocol for transmission over the network for communicating with the position, said second protocol for transmitting messages between said first switching system and a second switching system.

24. An automatic call distributor (ACD) arrangement comprising:

ACD process means responsive to an incoming call to an ACD for assigning an agent position for serving the call, and for communicating with the agent position using data messages;

link monitoring process means for communicating with a data link connected to a switching system;

control process means for receiving a message from the position requesting attachment of the position to the ACD, for enabling a front-end process means in response to the receipt of the message, and for setting up a message link for transmitting messages between the agent position and the front-end process means; wherein the front-end process means comprises means, responsive to said enabling, for notifying the ACD process means of the request to attach the position to the ACD; and means for setting up a message link between the link monitoring process means and the front-end process means, and between the front-end process means and the ACD process means for communicating messages between the position and the ACD process means.

25. The arrangement of claim 24 wherein the ACD process means sends a login request message to the position via the front-end process means, and receives a login message from the position via the front-end process means;

the ACD process means, responsive to the login message for verifying the login message and for adding the position to a list of active positions in response to the verification.

* * * * *